(12) United States Patent
Ryu et al.

(10) Patent No.: US 8,107,629 B2
(45) Date of Patent: Jan. 31, 2012

(54) METHOD OF PROVIDING SECURITY FOR RELAY STATION

(75) Inventors: Ki Seon Ryu, Seoul (KR); Chang Jae Lee, Cheonan-si (KR)

(73) Assignee: LG Electronics Inc., Seoul (KR)

( * ) Notice: Subject to any disclaimer, the term of this patent is extended or adjusted under 35 U.S.C. 154(b) by 591 days.

(21) Appl. No.: 12/090,634

(22) PCT Filed: Oct. 18, 2006

(86) PCT No.: PCT/KR2006/004235
§ 371 (c)(1),
(2), (4) Date: Oct. 14, 2008

(87) PCT Pub. No.: WO2007/046630
PCT Pub. Date: Apr. 26, 2007

(65) Prior Publication Data
US 2009/0074189 A1    Mar. 19, 2009

(30) Foreign Application Priority Data

Oct. 18, 2005  (KR) ........................ 10-2005-0097905

(51) Int. Cl.
*H04K 1/00* (2006.01)
(52) U.S. Cl. ........ 380/272; 380/247; 380/270; 380/277; 380/284; 455/436; 455/439; 455/410; 455/411; 370/331
(58) Field of Classification Search .................. 380/270, 380/277, 246, 272, 284; 726/3; 455/410–411, 455/437, 436, 439; 370/338, 409, 331
See application file for complete search history.

(56) References Cited

U.S. PATENT DOCUMENTS

| | | | | |
|---|---|---|---|---|
| 6,418,130 B1 * | 7/2002 | Cheng et al. | ................. | 370/331 |
| 6,587,680 B1 * | 7/2003 | Ala-Laurila et al. | .......... | 455/411 |
| 7,031,722 B2 * | 4/2006 | Naghian | .................... | 455/456.1 |
| 7,188,253 B2 * | 3/2007 | Halasz et al. | ................. | 713/182 |
| 7,899,053 B2 * | 3/2011 | Liu et al. | ....................... | 370/392 |
| 2006/0067272 A1 * | 3/2006 | Wang et al. | ................... | 370/331 |
| 2006/0236377 A1 * | 10/2006 | Metke et al. | ..................... | 726/4 |
| 2006/0240802 A1 * | 10/2006 | Venkitaraman et al. | ...... | 455/411 |

(Continued)

FOREIGN PATENT DOCUMENTS

CA    2260911 A1    2/1998

(Continued)

OTHER PUBLICATIONS

Burbank et al., "IEEE 802.16 Broadband Wireless Technology and Its Application to the Military Problem Space," pp. 1-7, Oct. 2005, XP-010901449.

(Continued)

*Primary Examiner* — Yin-Chen Shaw
(74) *Attorney, Agent, or Firm* — Lee, Hong, Degerman, Kang & Waimey

(57) ABSTRACT

A method of providing security of a relay station is disclosed, by which the security can be provided for the relay station in a broadband wireless access system having the relay station. In a mobile communication system to relay a signal transfer between a base station and a mobile station, the present invention includes the steps of performing a relay station authentication from an authentication server using an authentication protocol, receiving a master key from the authentication server, deriving an authentication key from the received master key, deriving a message authentication code (MAC) key using the derived authentication key, and relaying a signal exchanged between the mobile station and the base station using the derived message authentication code key.

11 Claims, 6 Drawing Sheets

U.S. PATENT DOCUMENTS

2007/0288997 A1* 12/2007 Meier et al. .................. 726/4
2007/0297611 A1* 12/2007 Yun et al. ..................... 380/270

FOREIGN PATENT DOCUMENTS

| JP | 10304446 A | 11/1998 |
| JP | 2003-069581 | 3/2003 |
| JP | 2003/102049 A | 4/2003 |
| JP | 2004-208073 | 7/2004 |
| JP | 2004-343764 | 12/2004 |
| JP | 2005-086350 | 3/2005 |
| KR | 1020050060636 | 6/2005 |

OTHER PUBLICATIONS

Eklund et al., "IEEE Standard 802.16: A Technical Overview of the WirelessMAN Air Interface for Broadband Wireless Access," IEEE Communications Magazine, pp. 98-107, Jun. 2002, XP-011092870.

IEEE Standard, "Part 16: Air Interface for Fixed and Mobile Broadband Wireless Access Systems—Amendment for Physical and Medium Access Control Layers for Combined Fixed and Mobile Operation in Licensed Bands," IEEE P802.16e/D5a, Dec. 2004, XP-002424582.

* cited by examiner

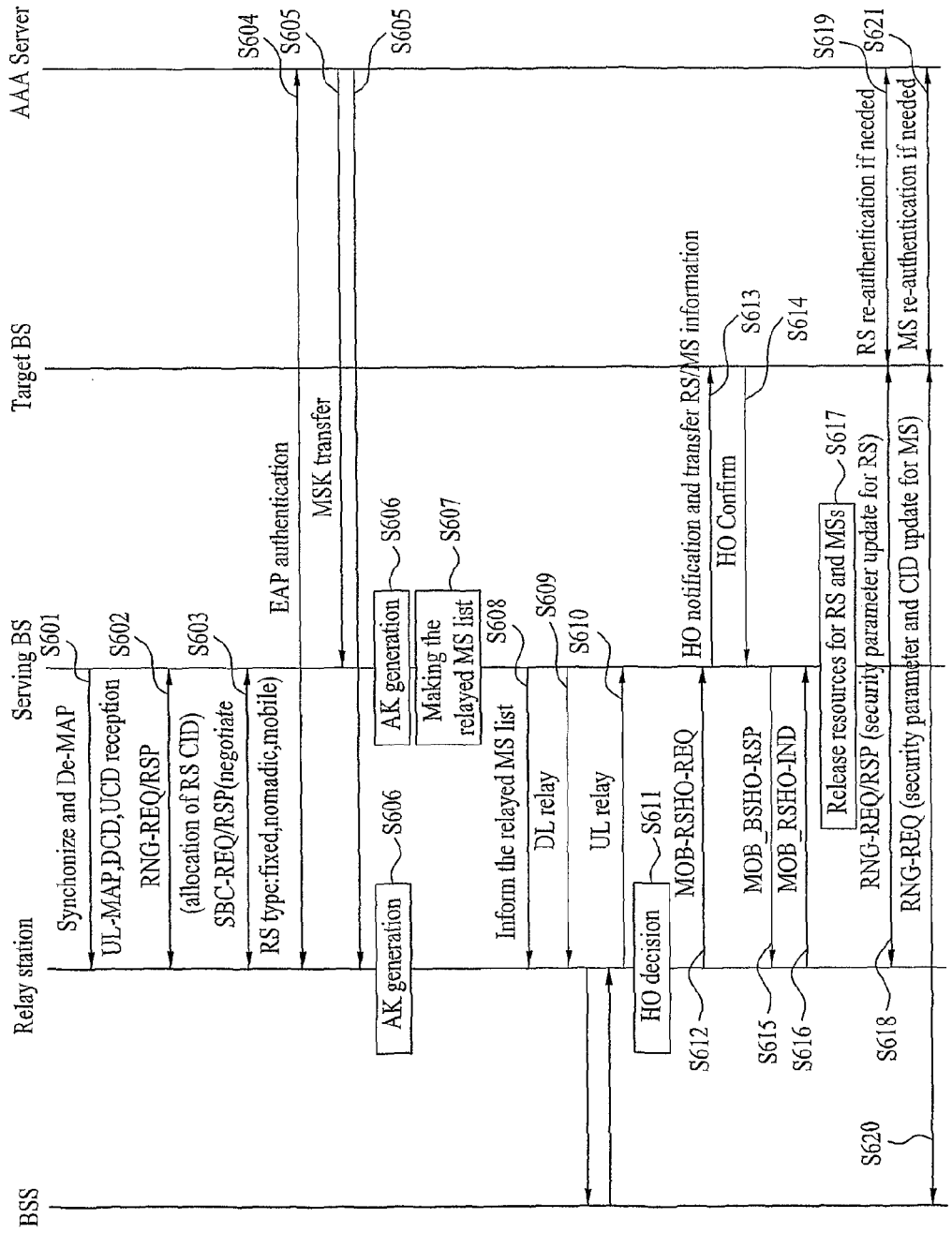

METHOD OF PROVIDING SECURITY FOR RELAY STATION

CROSS-REFERENCE TO RELATED APPLICATIONS

This application is a national stage application of International Application No. PCT/KR2006/004235, filed on Oct. 18, 2006, which claims the benefit of earlier filing date and right of priority to Korean Application No. 10-2005-0097905, filed on Oct. 18, 2005, the contents of all of which are hereby incorporated by reference herein in their entirety

TECHNICAL FIELD

The present invention relates to a security providing method applied to a broadband wireless access system, and more particularly, to a method of providing security of a relay station. Although the present invention is suitable for a wide scope of applications, it is particularly suitable for providing the security of the relay station that relays signals between a mobile station and a base station.

BACKGROUND ART

FIG. 1 is a structural diagram of a security sublayer applied to a broadband wireless access system.

Referring to FIG. 1, in a broadband wireless access system, as a security requirement, authentication, privacy of data and integrity of data are provided using a PKM(privacy and key management) protocol.

An authentication procedure is carried out via validity update of an authentication key in case that a mobile station enters a network. The authentication procedure can be also carried out using RSA (Rivest, Shamir, Adleman) or EAP (extensible authentication protocol) authentication protocol in case that a mobile station performs a handover.

In order to secure data confidentiality and data integrity between a mobile station and a base station, SA (security association) is established. The SA includes a data encryption key used for the security of the data encryption and integrity in transmission of user data between a base station and a mobile station, and includes a cryptographic suite of an initialization vector and the like.

And, the PKM protocol enables protection against threats such as a replay attack by an unauthorized user and the like in a manner of defining an authentication key update procedure via re-authentication and an encryption key update procedure and the like.

FIG. 2 is a diagram to explain a communication performing method using a relay station according to a related art.

Referring to FIG. 2, a relay station can be used for service coverage extension and data throughput improvement. In particular, a relay station plays a role as a relay between a mobile station and a base station, whereby a service area is extended or higher data throughput can be provided. A network including the relay station has a tree structure where a base station is a terminal point of a relayed data path.

Meanwhile, the relay station is compatible with a conventional PMP (point-to-multipoint) system. And, a frequency band of the relay system can be equal to or be adjacent to that of the PMP system. The relay station includes a fixed relay station, a nomadic relay station and a mobile relay station.

FIG. 3 is a diagram to explain operations of a relay station according to a related art.

Referring to FIG. 3, a relay station includes a relay station 32 for data throughput improvement and a relay station 34 for service coverage extension.

The relay station 32 for data throughput improvement relays user data exchanged between a mobile station 33 and a base station 31. But, a control message broadcasted from the base station 31 or an uplink control message transmitted from the mobile station 33 is directly transmitted or received between the base station 31 and the mobile station 33.

The relay station 34 for service coverage extension relays user data exchanged between the mobile station 35 and the base station 31 and also relays a control message broadcasted from the base station 31 or an uplink control message transmitted from the mobile station 35.

So, compared to the directly transmitted data, the relayed data have one or more frame delays. Meanwhile the relay station is able to raise overall data throughput by transmitting data in a manner of applying modulation and coding schemes according to a channel status. In a broadband wireless access system, authentication and data encryption procedure between a mobile station and a base station in link layer can be provided for security. A relay station in the broadband wireless access system relays data between the base station and the mobile station. And, a necessary signaling procedure can be provided for list control of mobile stations communicating with the relay station between the relay station and the base station or between the relay station and each mobile station. Moreover, in case that a mobile station performs a handover, a relay station may be involved in the handover.

As mentioned in the foregoing description, in order to define control signaling in MAC layer between a base station (or a relay station) and a mobile station and to control coding and modulation of relayed data, an authentication procedure for the relay station is needed.

However, the related art fails to provide the authentication and security associated procedures for the relay station.

DISCLOSURE OF THE INVENTION

Accordingly, the present invention is directed to a method of providing security of a relay station that substantially obviates one or more of the problems due to limitations and disadvantages of the related art.

An object of the present invention is to provide a method of providing security of a relay station, by which the security can be provided for the relay station in a broadband wireless access system having the relay station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of providing a security of a relay station includes the steps of performing a relay station authentication via an authentication server using an authentication protocol, receiving a master key from the authentication server, deriving an authentication key from the received master key, deriving a message authentication code (MAC) key using the derived authentication key, and relaying a signal transmitted between the mobile station and the base station using the derived message authentication code key.

To further achieve these and other advantages and in accordance with the purpose of the present invention, a method of providing a security of a relay station, which is provided to a mobile communication system to relay a signal transfer between a base station and a mobile station, includes the steps of receiving a master key from an authentication server, deriving an authentication key from the received master key, generating a list of the mobile station relayed by the relay station, transmitting the mobile station list to the relay station, and transmitting uplink and downlink signals via the relay station using the authentication key.

Accordingly, in the mobile communication system including the relay station, the present invention provides the authentication method for the relay station, thereby enabling the relayed data to be safely delivered.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a flowchart of a network registration procedure and relaying process of a mobile relay station according to one embodiment of the present invention.

BEST MODE FOR CARRYING OUT THE INVENTION

Reference will now be made in detail to the preferred embodiments of the present invention, examples of which are illustrated in the accompanying drawings.

Figure 1:
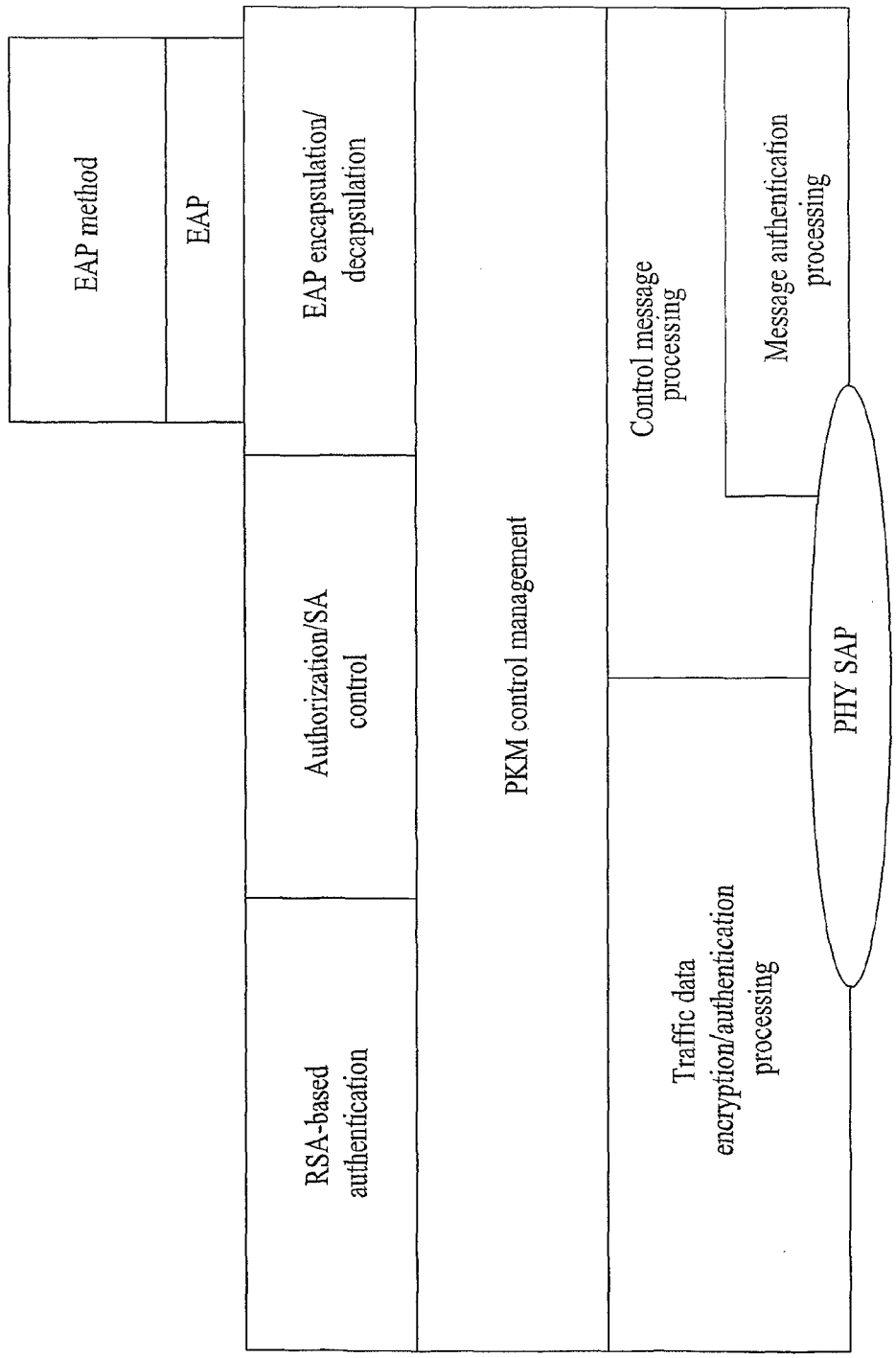
FIG. 1 is a structural diagram of a security sublayer applied to a broadband wireless access system according to a related art.
Figure 2:
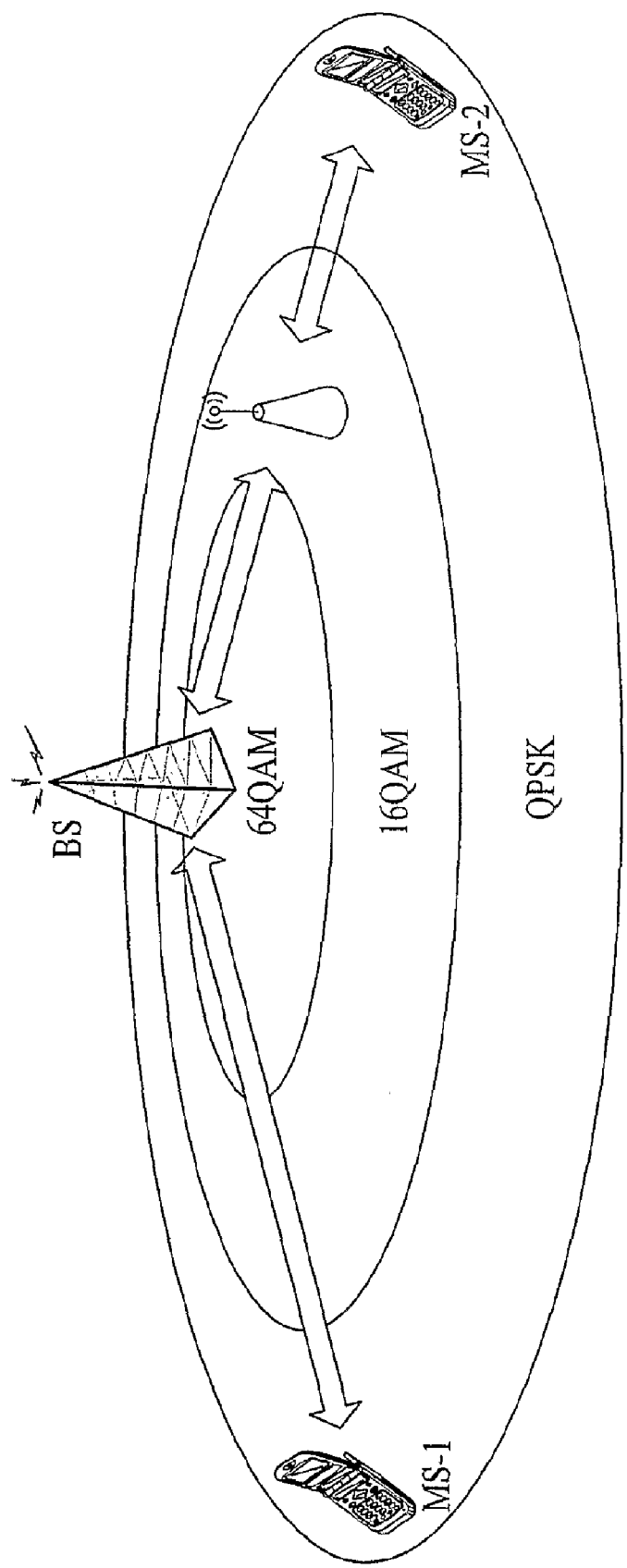
FIG. 2 is a diagram to explain a communication performing method using a relay station according to a related art.
Figure 3:
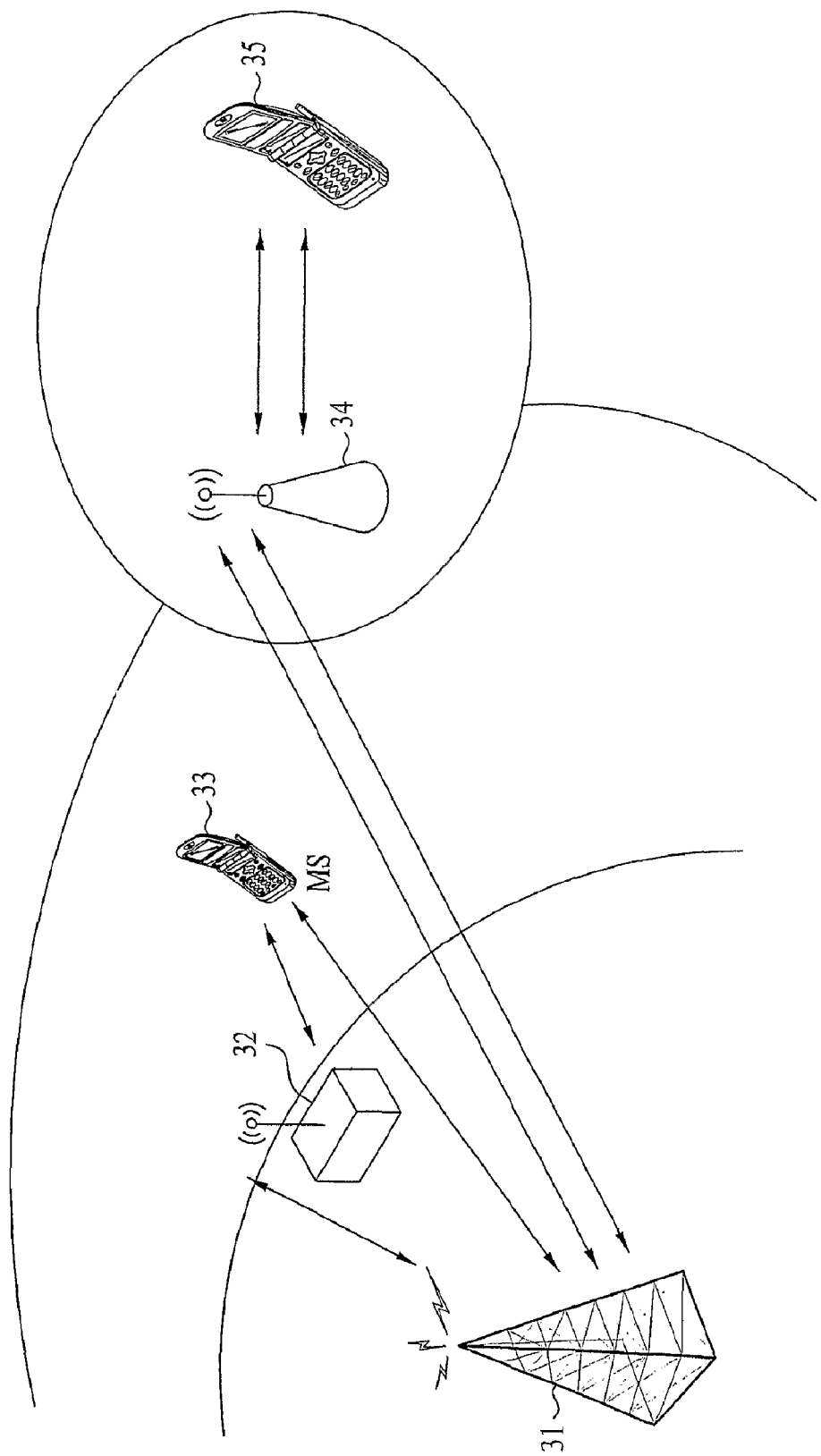
FIG. 3 is a diagram to explain operations of a relay station according to a related art.
Figure 4:
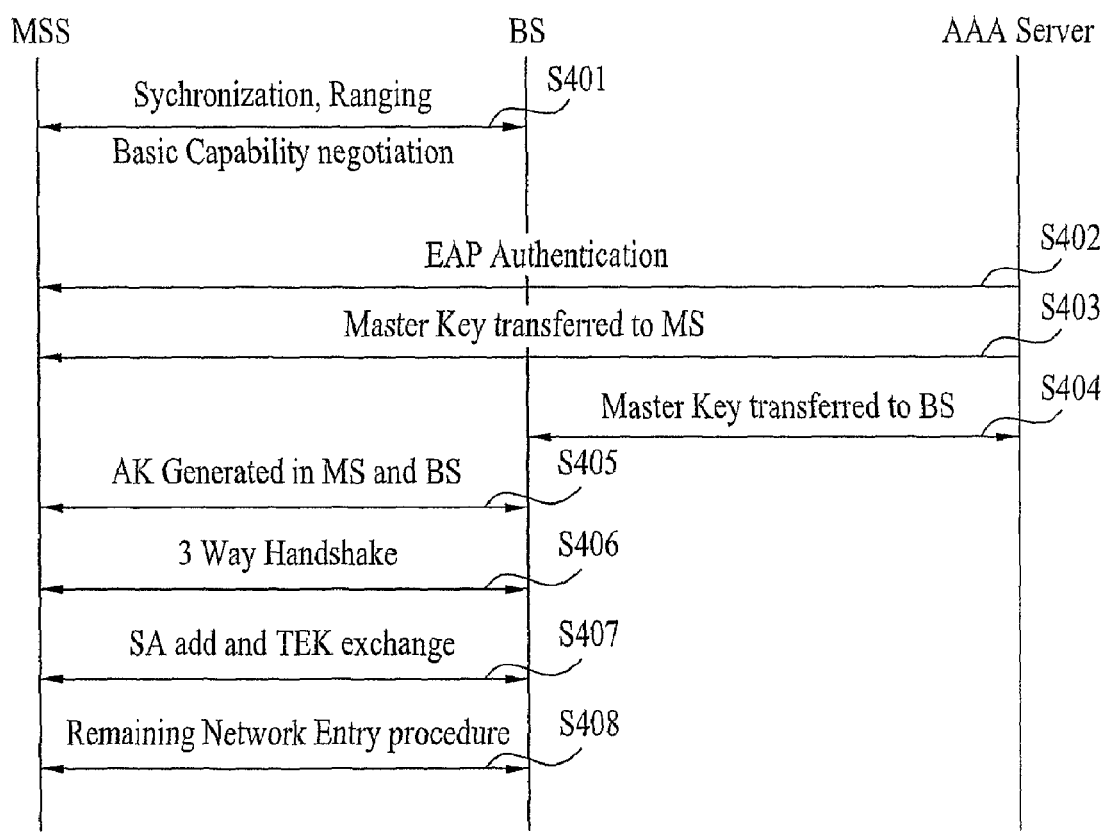
FIG. 4 is a flowchart of a mobile station authenticating procedure applied to a broadband wireless access system according to one embodiment of the present invention.

FIG. 4 is a flowchart of a mobile station authenticating procedure applied to a broadband wireless access system according to one embodiment of the present invention.

Referring to FIG. 4, a mobile station searches for a downlink channel to make a registration to a network and then obtains uplink/downlink synchronization with a base station (S41). In this case, the mobile station adjusts an uplink transmission parameter by performing a ranging and then makes a negotiation with the base station for security associated basic performance such as an authentication scheme with the base station, data encryption algorithm, data integrity algorithm, a message authentication method, etc.

The mobile station performs an authentication procedure through an authentication protocol such as an EAP (extensible authentication protocol) with an authentication server and the base station (S42). Once the authentication for the mobile station is completed, the mobile station receives a master key from the authentication server (S43).

Meanwhile, the base station receives a master key for the mobile station from the authentication server (S44). And, each of the mobile station and the base station generates an authentication key from the received master key. Each of the mobile station and the base station generates a message authentication code key for integrity of MAC(media access control) management message and a KEK(key encryption key) to encrypt a TEK(traffic encryption key). And, the mobile station and the base station perform 3-way handshake to test validity of the authentication key and then perform mutual authentication (S45).

The mobile station decides data encryption and integrity algorithm for user data delivery, traffic key encryption algorithm and the like by setting up security association with the base station and then actually receives the TEK for user data encryption from the base station (S46). After completion of the security associated procedure, the mobile station performs a necessary network registration procedure.

A method of a relay station associated networking is explained as follows.

First of all, a relay station performs a network registration procedure or a handover procedure to perform communications with a base station. And, the relay station performs an authentication procedure for relay station authentication via an authentication server in the course of performing the network registration procedure or the handover procedure.

A message authentication code key to secure integrity of a MAC(media access control) management message exchanged between the base station and the mobile station is derived from an authentication key given by the authentication server through the authentication procedure, by which integrity of control signaling between the relay station and the base station is secured.

The relay station plays a role in relaying messages and data between the mobile station and the base station. Yet, separate SA is not established between the relay station and the base station or between the relay station and the mobile station. So, the relay station transmits encrypted media access control (MAC) protocol data unit (PDU) which is received from the mobile station or the base station without additional data encryption or decryption on the MAC PDU.

In the following description, a security providing method applied to a fixed/nomadic relay station or a mobile relay station according to a relay station type is explained.

First of all, the fixed/nomadic relay station performs operations according to a list configuration of a mobile station performing a network registration procedure and relay, relay execution, re-authentication of relay station and a process for releasing the network registration of the relay station.

Secondly, in case that the mobile relay station performs a handover into another base station area of a relay station, re-authentication of the relay station and a group handover process for mobile stations to be relayed can be additionally provided as well as the above-explained operations performed by the fixed/nomadic relay station.

Figure 5:
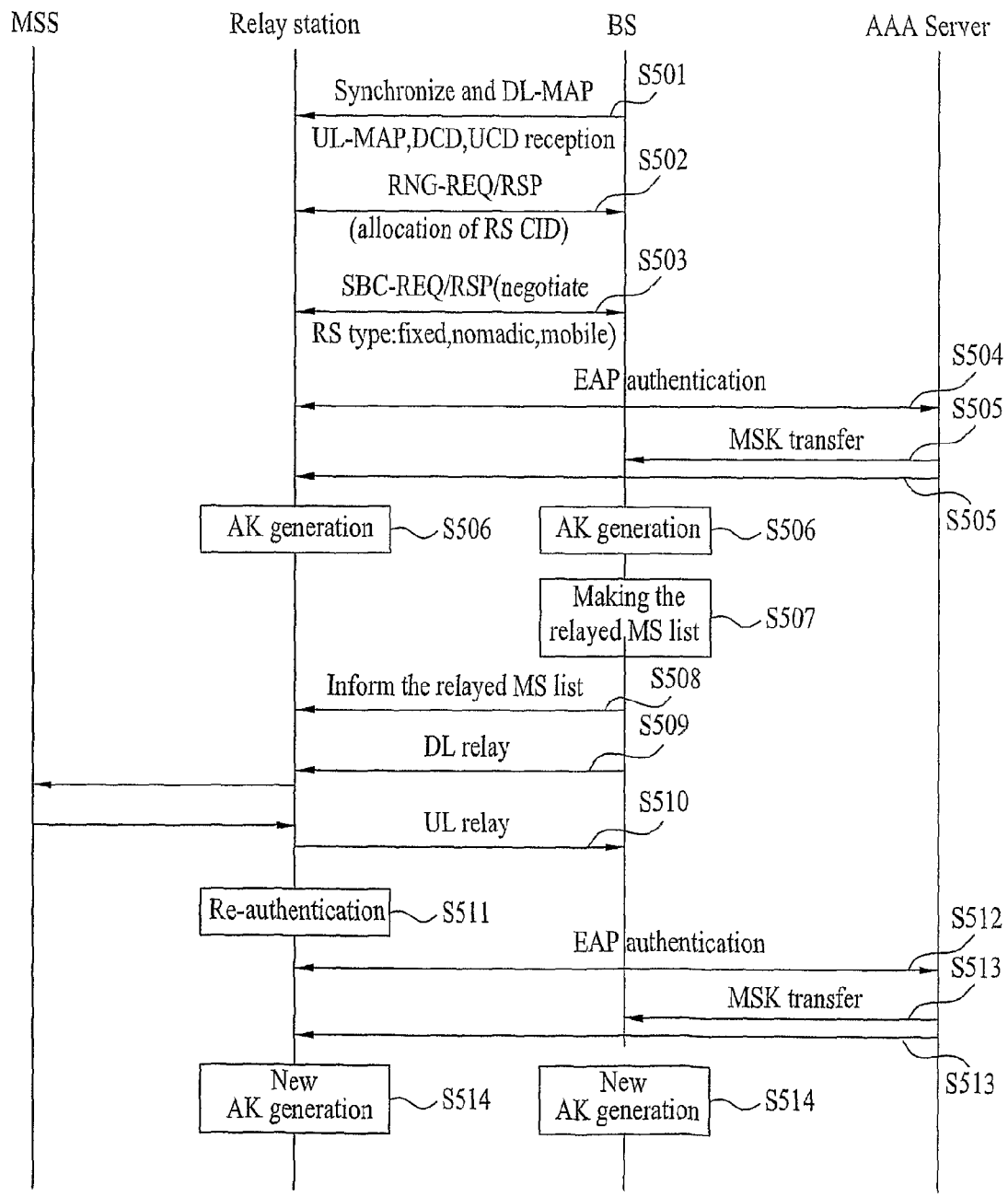
FIG. 5 is a flowchart of a network registration procedure and relaying process of a fixed/nomadic relay station according to one embodiment of the present invention.

FIG. 5 is a flowchart of a network registration procedure and relaying process of a fixed/nomadic relay station according to one embodiment of the present invention.

Referring to FIG. 5, a relay station obtains downlink frame synchronization from a base station to communicate with the base station and receives an uplink/downlink map message and an uplink/downlink channel information message (S501).

The relay station adjusts an uplink transmission parameter through a ranging process with the base station (S502). In this case, a relay station identifier is delivered to the base station and the base station assigns a management connection ID to the corresponding relay station. Through the management connection ID of the relay station, the media access control (MAC) management message can be exchanged between the relay station and the base station and the data relay between the mobile station and the base station can be performed.

And, the relay station negotiates with the base station for basic performance. In doing so, type of the relay station (fixed type, a nomadic type or a mobile type) and security associated basic performance such as an authentication scheme, a message authentication code scheme and the like is negotiated (S503).

The relay station performs an authentication procedure for the relay station using the base station, authentication server and authentication protocol (S504) For example, an EAP (extensible authentication protocol) can be used as the authentication protocol.

Once the authentication of the relay station is completed from the authentication server, each of the relay station and the base station receives a master key from the authentication server (S505), derives an AK(authentication key) from the received master key (S506), and then derives a message authentication code (MAC) key by a key derivation function based on the derived AK.

Meanwhile, the base station establishes a list of a mobile station on which a relay will be performed (S507) and then delivers the list of the mobile station on which the relay will be performed to the relay station (S508). In this case, information for the mobile station on which the relay will be performed is transmitted to the relay station using an uplink/downlink map (UL/DL MAP) message or another media access control (MAC) management message. And, the relay station is able to transmit the list of the mobile station on which the relay will be performed to the base station using a media access control (MAC) management message.

The relay station receives downlink data from the base station and then transmits the received downlink data to the mobile station on which the relay will be performed (S509). The relay station receives uplink data from the mobile station and then transmits the received uplink data to the base station (S510). The relay functions of the uplink and downlink data are performed only while the authentication key of the relay station is valid between the base station and the relay station. So, if the authentication key of the relay station needs to be updated, the authentication procedure including the steps S504 to S506 is executed. If the relay station fails to update the authentication key through a re-authentication procedure until the authentication key expires, the base station directly communicates with the mobile station without the relay of the relay station.

In the above embodiment, the authentication of the relay station is performed using the EAP based authentication method. Yet, in case of performing the authentication of the relay station using the certificate based RSA system, the steps S504 to S506 and the steps S512 to S514 can be replaced by the following procedure.

First of all, the relay station delivers an authentication request message including the X.509 certificate to the base station.

The base station performs authentication of the relay station based on the certificate of the relay station and then delivers an authentication response message including an authentication key to the relay station.

Subsequently, the relay station derives a message authentication code (MAC) key by a key deriving function based on the authentication key delivered from the base station, Thereafter, the relay station performs a message authentication for integrity of a management message exchanged between the base station and the relay station using the derived MAC key.

FIG. 6 is a flowchart of a network registration procedure and relaying process of a mobile relay station according to one embodiment of the present invention.

Referring to FIG. 6, a relay station obtains a downlink frame synchronization from a base station to communicate with and receives a uplink/downlink map message and an uplink/downlink channel information message (S601).

The relay station adjusts an uplink transmission parameter through a ranging process with the base station (S602). In this case, a relay station identifier is delivered to the base station and the base station assigns a management connection ID to the corresponding relay station. Through the management connection ID of the relay station, the media access control (MAC) management message can be exchanged between the relay station and the base station and the data relay between the mobile station and the base station can be performed.

And, the relay station negotiates with the base station for basic performance. In doing so, type of the relay station(fixed type, a nomadic type or a mobile type) is negotiated, and security associated basic performance such as an authentication scheme, a message authentication code scheme and the like is negotiated (S603).

The relay station performs an authentication procedure for the relay station using the base station, authentication server and authentication protocol (S604). For example, an EAP (extensible authentication protocol) can be used as the authentication protocol.

Once the authentication of the relay station is completed at the authentication server, each of the relay station and the base station receives a master key from the authentication server (S605), derives an AK(authentication key) from the received master key (S606), and then derives a message authentication code (MAC) key by a key derivation function based on the derived AK.

Meanwhile, the base station establishes a list of a mobile station on which a relay will be performed (S607) and then delivers the list of the mobile station on which the relay will be performed to the relay station (S608). In this case, information for the mobile station on which the relay will be performed is transmitted to the relay station using an uplink/downlink map (UL/DL MAP) message or another media access control (MAC) management message. And, the relay station is able to transmit the list of the mobile station on which the relay will be performed to the base station using a media access control (MAC) management message.

The relay station receives downlink data from the base station and then transmits the received downlink data to the mobile station on which the relay will be performed (S609). The relay station receives uplink data from the mobile station and then transmits the received uplink data to the base station (S610). The relay functions of the uplink and downlink data are performed only while the authentication key of the relay station is valid between the base station and the relay station. So, if the authentication key of the relay station needs to be updated, the authentication procedure including the steps S604 to S607 is executed. If the relay station fails to update the authentication key through a re-authentication procedure until the authentication key expires, the base station directly communicates with the mobile station without the relay of the relay station.

The mobile relay station measures a signal quality of a neighbor base station and is able to carry out a handover associated operation if necessary. Once the relay station decides to perform a handover (S611), the relay station makes a handover request to a serving base station using a media access control (MAC) management message MOB_RSHO-REQ (S612). In this case, the relay station makes a handover request on behalf of the mobile station on which the relay will be performed or is able to operate in the same manner of receiving handover requests made by mobile stations on which the relay will be performed through a handover request made by the relay station.

The serving base station transmits handover information of the relay station and the relayed mobile stations to a backbone by transmitting security information for the relay station and service operation parameters for the relayed mobile stations to a handover target base station together with a handover notification (S613). Wherein, the security information includes security capability and authentication key context of the relay station and the service operation parameters includes security and service context information of the relayed mobile stations.

The target base station transmits a handover notification response such as a possibility of handover acceptance to the serving base station via the backbone (S614).

The serving base station performs a response to the handover request made by the relay station using a handover response message MOB_BSHO-RSP including a target base station identifier (S615). And, the relay station informs the serving base station that the handover into the target base station will be performed using a handover indication message MOB_RSHO-IND (S616).

The serving base station releases radio resources associated with mobile stations relayed by the relay station (S617), adjusts a transmission parameter with the target base station via a ranging procedure, and updates a management connection identifier of the relay station and security associated parameters (S618). If a re-authentication procedure needs to be performed via handover, the relay station executes the step S601 to S606 to perform the re-authentication procedure with the base station and the authentication server (S619).

If basic performance parameters, security parameters such as an authentication key, a data encryption key and the like, service flow parameters such as a CID, a QoS parameter and the like need to be updated, service continuity can be maintained in a manner that the mobile stations relayed according to the handover execution of the relay station receive the updated parameters from the base station via the MAC (media access control) management message (S620).

As the relay station performs the handover, if a re-authentication procedure for the relayed mobile station entering a new base station needs to be executed, the mobile station performs the steps S42 to S46 shown in FIG. 4 with the authentication server and the base station.

In the above embodiment of the present invention, the security associated procedure applied to the network entry and handover of the mobile relay station has been explained. Yet, if the mobile relay station needs re-authentication for an authentication key update, the steps S511 and S514 shown in FIG. 5 can be executed.

In the above embodiment of the present invention, a case of performing the authentication of the relay station using the EAP based authentication method is shown. Yet, in case of performing the authentication of the relay station using the certificate based RSA authentication method, a procedure including the steps S604 to S606 and the step S619 needing re-authentication can be replaced by the following procedure.

First of all, the relay station delivers an authentication request message including the X.509 certificate to the base station.

The base station performs authentication of the relay station based on the certificate of the relay station and then delivers an authentication response message including an authentication key.

Subsequently, the relay station derives a message authentication code (MAC) key by a key deriving function based on the authentication key delivered from the base station.

Thereafter, the relay station performs a message authentication for integrity of a management message exchanged between the base station and the relay station using the derived MAC key.

INDUSTRIAL APPLICABILITY

Accordingly, the present invention is applicable to a broadband wireless access system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of providing security for a relay station, which is provided to a mobile communication system for relaying communications between a base station and a mobile station, the method comprising:
    performing, by the relay station, an authentication of the relay station to an authentication server using an authentication protocol;
    receiving, by the relay station, an authentication server master key;
    deriving, by the relay station, an authentication key from the received authentication server master key;
    deriving, by the relay station, a message authentication code (MAC) key using the derived authentication key;
    relaying, by the relay station, a signal between the mobile station and the base station according to a control signal sent from the relay station to the base station;
    performing, by the relay station, a handover from the base station to a second base station; and
    executing, by the relay station, a ranging procedure for transmission parameter adjustment and management connection identifier (CID) and security associated parameter updates of the relay station with respect to the second base station,
    wherein the control signal is sent to the base station using the derived MAC key, and
    wherein the relay station comprises a mobile relay station.

2. The method of claim 1, wherein the authentication protocol is an extensible authentication protocol (EAP).

3. The method of claim 1, wherein a security association (SA) of the relay station is not established with respect to either the mobile station or the base station.

4. The method of claim 3, further comprising:
    performing the authentication of the relay station and deriving the MAC key, if the authentication key needs to be updated.

5. The method of claim 3, further comprising receiving a list of mobile stations to be served by the relay station.

6. The method of claim 1, further comprising:
    performing the authentication of the relay station and deriving the message authentication code key if the authentication key needs to be updated.

7. The method of claim 1, wherein the relay station comprises either a relay station for data throughput improvement or a relay station for service coverage extension.

8. A method of providing security for a relay station, the method comprising:

receiving, by a base station, an authentication server master key; deriving, by the base station, an authentication key from the received authentication server master key;

deriving, by the base station, a message authentication code (MAC) key using the derived authentication key;

generating a list of mobile stations to be served by the relay station; transmitting the list to the relay station;

sending a downlink signal to the relay station and receiving an uplink signal according to a control signal sent from the base station to the relay station;

receiving, by the base station, a handover request of the relay station from the base station to a second base station; and transmitting, by the base station, handover information including security information for the relay station and service operation parameters for the mobile stations to be served, to the second base station, wherein the security information for the relay station comprises security capability and authentication key context of the relay station, and wherein the service operation parameters for the mobile stations to be served comprise security and service context information of the mobile stations to be served;

wherein the control signal is sent to the relay station using the derived MAC key.

9. The method of claim 8, wherein transmitting the list to the relay station comprises transmitting the list via an uplink/downlink map message or a media access control management message.

10. The method of claim 1, wherein the control signal comprises a media access control management message.

11. The method of claim 8, wherein the control signal comprises a media access control management message.

* * * * *